US012626483B2

(12) United States Patent
Balavalikar Krishnamurthy et al.

(10) Patent No.: US 12,626,483 B2

(45) Date of Patent: May 12, 2026

(54) REDUCING FALSE POSITIVE IDENTIFICATIONS DURING VIDEO CONFERENCING TRACKING AND DETECTION

(71) Applicant: Hewlett-Packard Development Company, L.P., Spring, TX (US)

(72) Inventors: Raghavendra Balavalikar Krishnamurthy, Austin, TX (US); Rajen Bhatt, Philadelphia, PA (US); David Bryan, Austin, TX (US); Yong Yan, Austin, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 756 days.

(21) Appl. No.: 17/735,086

(22) Filed: May 2, 2022

(65) Prior Publication Data

US 2023/0351727 A1 Nov. 2, 2023

(51) Int. Cl.
G06V 10/74 (2022.01)
G06V 20/40 (2022.01)
(Continued)

(52) U.S. Cl.
CPC ............ G06V 10/761 (2022.01); G06V 20/41 (2022.01); G06V 40/161 (2022.01); H04N 5/2628 (2013.01)

(58) Field of Classification Search
CPC .... G06V 10/761; G06V 20/41; G06V 40/161; G06V 10/764; G06V 20/48; H04N 5/2628; H04N 7/147
See application file for complete search history.

(56) References Cited

U.S. PATENT DOCUMENTS 5,850,470 A * 12/1998 Kung ................ G06F 18/24155
382/116
10,140,421 B1 11/2018 Bernard et al.
(Continued)

FOREIGN PATENT DOCUMENTS

CN 112070799 A 12/2020
CN 112184750 A 1/2021
(Continued)

OTHER PUBLICATIONS

"A.V.Navya, Smart Attendance Using Image Processing Techniques, 2018-2019, Department of Electronics and Communication Engineering Anil Neerukonda Institute of Technology and Sciences, Project Report, pp. 1-63" (Year: 2018).*
(Continued)

*Primary Examiner* — Andrew W Bee
*Assistant Examiner* — D J Dhooge
(74) *Attorney, Agent, or Firm* — Quarles & Brady LLP

(57) ABSTRACT

A method including detecting, in a digital image, a set of sub-images matching a selected object type. The method also includes generating a first confidence score that a first sub-image in set of sub-images matches a selected object type. The method also includes generating a second confidence score that a second sub-image in set of sub-images matches the selected object type. The method also includes generating a similarity measure by comparing the first sub-image to the second sub-image. The method also includes removing, responsive to the similarity measure exceeding a similarity threshold value and the first confidence score exceeding the second confidence score, the second sub-image from the set of sub-images. The method also includes processing, after removing, the digital image using the set of sub-images.

12 Claims, 7 Drawing Sheets

(51) Int. Cl.
    G06V 40/16        (2022.01)
    H04N 5/262      (2006.01)

(56)              References Cited

U.S. PATENT DOCUMENTS

| | | | |
|---|---|---|---|
| 2014/0184745 A1 | 7/2014 | Lv et al. | |
| 2016/0261793 A1* | 9/2016 | Sivan | G06F 3/013 |
| 2018/0342060 A1* | 11/2018 | Yao | G16H 40/20 |
| 2020/0186727 A1 | 6/2020 | Denoue et al. | |
| 2021/0064910 A1 | 3/2021 | Meier et al. | |
| 2021/0243346 A1 | 8/2021 | Bhatia et al. | |
| 2022/0148337 A1* | 5/2022 | Meng | G06V 20/46 |

FOREIGN PATENT DOCUMENTS

| | | |
|---|---|---|
| CN | 113177968 A | 7/2021 |
| EP | 1542153 A1 | 6/2005 |

OTHER PUBLICATIONS

Camio: Using Camio—Troubleshooting, "How do I exclude reflections of people from social distancing detection?"; Dec. 15, 2021(2 pages). https://help.camio.com/hc/en-us/articles/360041440252.

\* cited by examiner

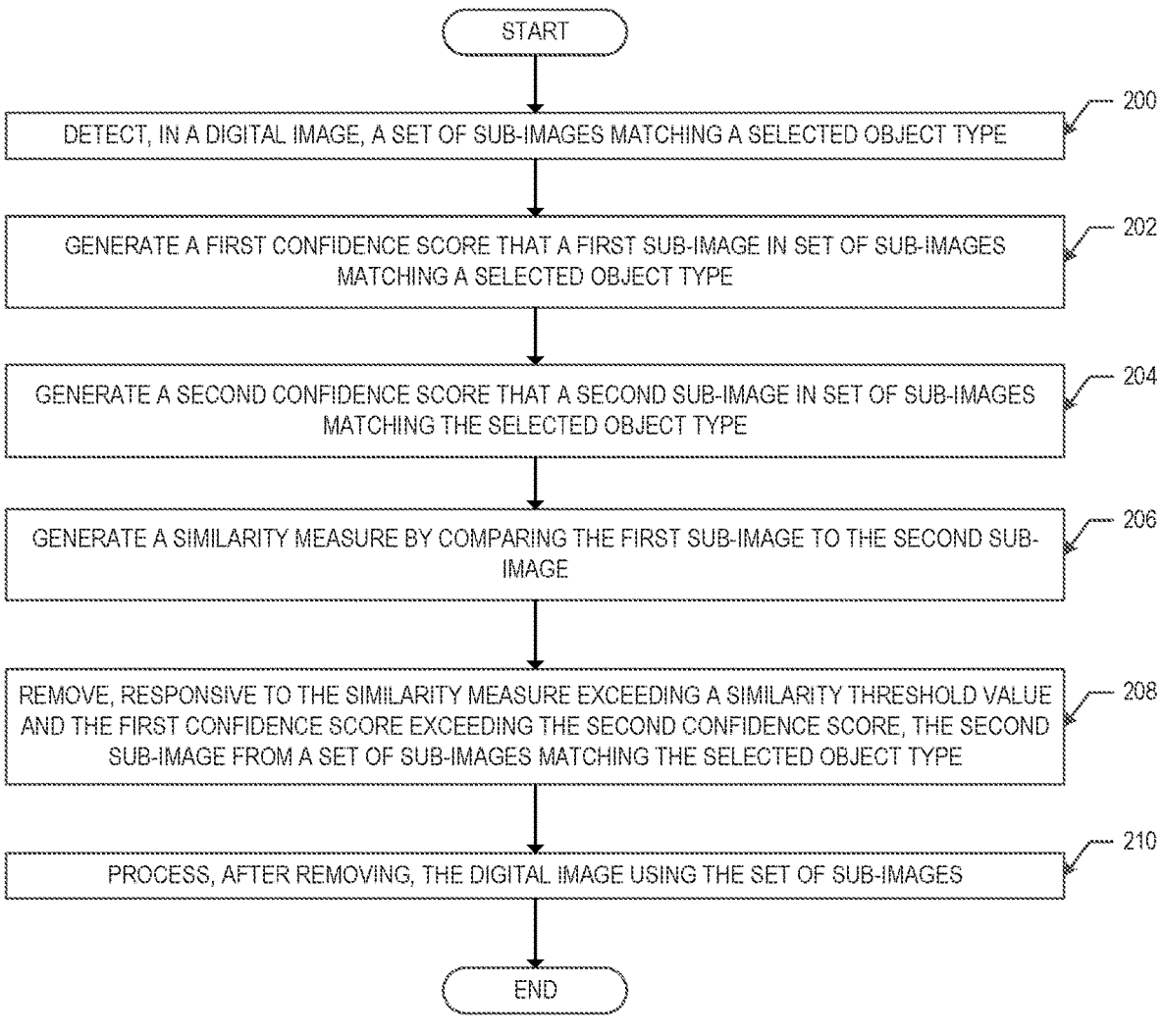

START

DETECT, IN A DIGITAL IMAGE, A SET OF SUB-IMAGES MATCHING A SELECTED OBJECT TYPE — 200

GENERATE A FIRST CONFIDENCE SCORE THAT A FIRST SUB-IMAGE IN SET OF SUB-IMAGES MATCHING A SELECTED OBJECT TYPE — 202

GENERATE A SECOND CONFIDENCE SCORE THAT A SECOND SUB-IMAGE IN SET OF SUB-IMAGES MATCHING THE SELECTED OBJECT TYPE — 204

GENERATE A SIMILARITY MEASURE BY COMPARING THE FIRST SUB-IMAGE TO THE SECOND SUB-IMAGE — 206

REMOVE, RESPONSIVE TO THE SIMILARITY MEASURE EXCEEDING A SIMILARITY THRESHOLD VALUE AND THE FIRST CONFIDENCE SCORE EXCEEDING THE SECOND CONFIDENCE SCORE, THE SECOND SUB-IMAGE FROM A SET OF SUB-IMAGES MATCHING THE SELECTED OBJECT TYPE — 208

PROCESS, AFTER REMOVING, THE DIGITAL IMAGE USING THE SET OF SUB-IMAGES — 210

END

*FIG. 2*

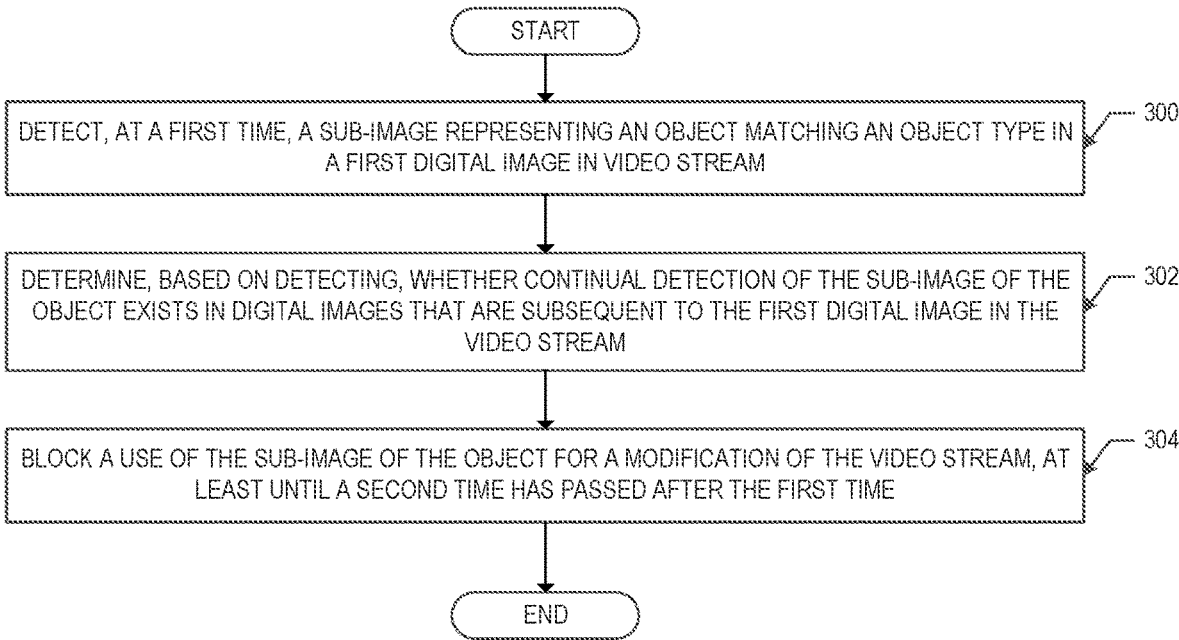

START

DETECT, AT A FIRST TIME, A SUB-IMAGE REPRESENTING AN OBJECT MATCHING AN OBJECT TYPE IN A FIRST DIGITAL IMAGE IN VIDEO STREAM — 300

DETERMINE, BASED ON DETECTING, WHETHER CONTINUAL DETECTION OF THE SUB-IMAGE OF THE OBJECT EXISTS IN DIGITAL IMAGES THAT ARE SUBSEQUENT TO THE FIRST DIGITAL IMAGE IN THE VIDEO STREAM — 302

BLOCK A USE OF THE SUB-IMAGE OF THE OBJECT FOR A MODIFICATION OF THE VIDEO STREAM, AT LEAST UNTIL A SECOND TIME HAS PASSED AFTER THE FIRST TIME — 304

END

*FIG. 3*

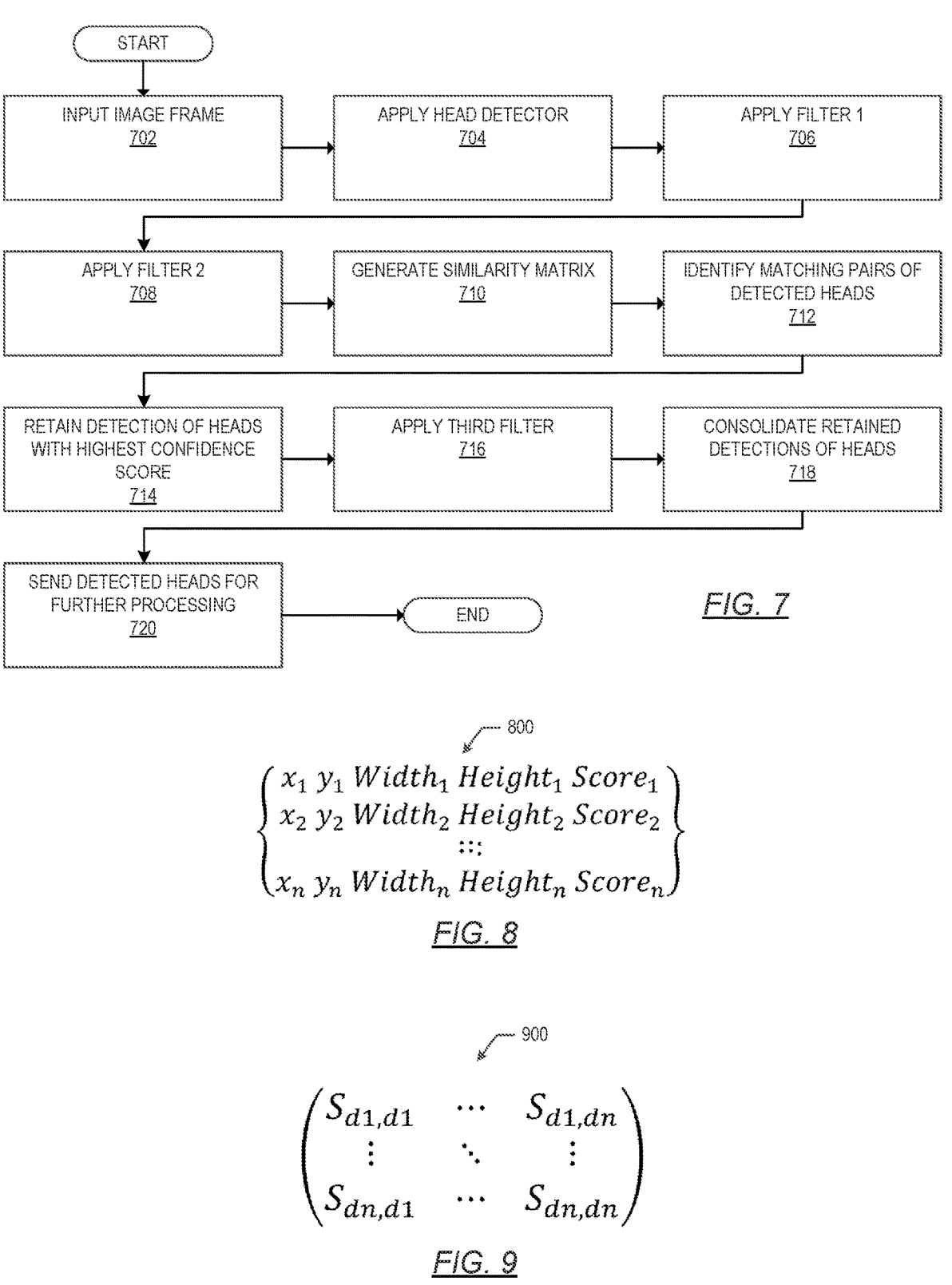

START

| INPUT IMAGE FRAME 702 | → | APPLY HEAD DETECTOR 704 | → | APPLY FILTER 1 706 |

| APPLY FILTER 2 708 | → | GENERATE SIMILARITY MATRIX 710 | → | IDENTIFY MATCHING PAIRS OF DETECTED HEADS 712 |

| RETAIN DETECTION OF HEADS WITH HIGHEST CONFIDENCE SCORE 714 | → | APPLY THIRD FILTER 716 | → | CONSOLIDATE RETAINED DETECTIONS OF HEADS 718 |

| SEND DETECTED HEADS FOR FURTHER PROCESSING 720 | → | END |

FIG. 7

$$\begin{Bmatrix} x_1 \ y_1 \ Width_1 \ Height_1 \ Score_1 \\ x_2 \ y_2 \ Width_2 \ Height_2 \ Score_2 \\ \vdots \\ x_n \ y_n \ Width_n \ Height_n \ Score_n \end{Bmatrix}$$ 800

FIG. 8

$$\begin{pmatrix} S_{d1,d1} & \cdots & S_{d1,dn} \\ \vdots & \ddots & \vdots \\ S_{dn,d1} & \cdots & S_{dn,dn} \end{pmatrix}$$ 900

FIG. 9

REDUCING FALSE POSITIVE IDENTIFICATIONS DURING VIDEO CONFERENCING TRACKING AND DETECTION

BACKGROUND

Video conferencing systems may use detection and tracking and detection software to identify sub-images of objects shown in an image or a video stream. However, the tracking and detection and detection software may undesirably detect a sub-image of a reflection of a person as a sub-image of a real person. Thus, for example, if a camera is capturing an image or a video stream of a conference room having a glass wall, glass window, or any reflective surface, then the tracking and detection and detection software undesirably may treat images of person's reflection in the glass as images of a real person.

SUMMARY

The one or more embodiments provide for a method. The method includes detecting, in a digital image, a set of sub-images matching a selected object type. The method also includes generating a first confidence score that a first sub-image in set of sub-images matches a selected object type. The method also includes generating a second confidence score that a second sub-image in set of sub-images matches the selected object type. The method also includes generating a similarity measure by comparing the first sub-image to the second sub-image. The method also includes removing, responsive to the similarity measure exceeding a similarity threshold value and the first confidence score exceeding the second confidence score, the second sub-image from the set of sub-images. The method also includes processing, after removing, the digital image using the set of sub-images.

The one or more embodiments provide for another method. The method includes detecting, at a first time, a sub-image of an object matching an object type in a first digital image in video stream. The method also includes determining, based on detecting, whether continual detection of the sub-image of the object exists in digital images that are subsequent to the first digital image in the video stream. The method also includes blocking a use of the sub-image of the object for a modification of the video stream, at least until a second time has passed after the first time.

The one or more embodiments also provide for a controller. The controller includes an image processing controller executable by a processor to detect, in a digital image of a video stream, that sub-images correspond to a selected object type. The image processing controller is also executable by the processor to assign, to sub-images, confidence scores corresponding to the sub-images. The confidence scores including measures that the sub-images are of the selected object type. The controller also includes a first filter executable by the processor to block use of a first subset of the sub-images when modifying the video stream. The first subset includes first ones of the sub-images having confidence scores below a confidence threshold value. The controller also includes a second filter executable by the processor to delay, by a threshold time interval, use of a second subset of the sub-images when modifying the video stream. The second subset includes second ones of the sub-images detected before the threshold time interval. The controller also includes a third filter executable by the processor to block use of a selected sub-image in the sub-images when modifying the video stream. The selected sub-image is selected from one of a first sub-image having a first similarity score within a similarity threshold value of second similarity score of a second sub image. The selected sub-image includes a lower confidence score in the confidence scores. The controller also includes a video controller configured to modify the video stream using the first filter, the second filter, and the third filter.

Other aspects of the one or more embodiments will be apparent from the following description and the appended claims.

BRIEF DESCRIPTION OF DRAWINGS

FIG. 2 and FIG. 3 show flow diagrams illustrating a set of steps of a method for filtering a video stream, in accordance with one or more embodiments.

FIG. 7 is another method for filtering a video stream, in accordance with one or more embodiments.

FIG. 8 and FIG. 9 show examples of matrices used with respect to filtering a video stream, in accordance with one or more embodiments.

DETAILED DESCRIPTION

Figure 1:
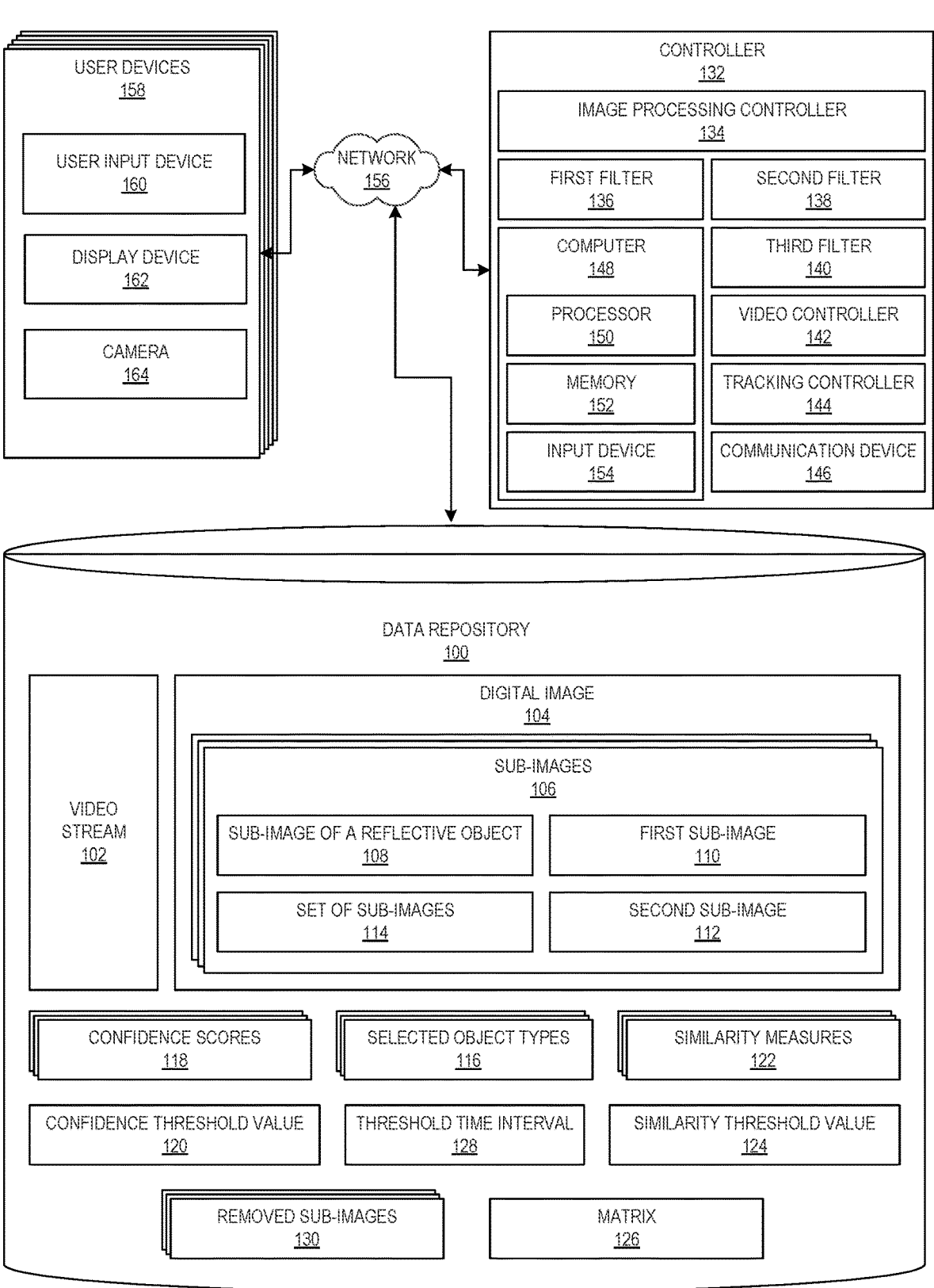
FIG. 1 shows a computing system, in accordance with one or more embodiments.

In general, the one or more embodiments relate to filtering a video stream. In particular, the one or more embodiments are useful for preventing video software or image tracking and detection software from undesirably detecting an image of a reflection of a person as an image of a physical person. In an example, reflections of people off glass walls, windows, or other reflective surfaces may be common in an indoor video conferencing environment. Reflections also may be amplified depending on camera placement and lighting conditions. The reflections may cause technical problems with respect to tracking and detection and detection software that is used to modify the video stream or image or to track one or more objects shown in the video stream.

For example, a video conferencing system may receive a video stream as input, and then use audio and video tracking and detection data in the video stream in order to frame groups of individuals, automatically adjust a zoom level of the video stream, frame a speaker in a video stream, identify individuals in an image or video stream, or perform other tracking and detection functions. However, if the tracking and detection software incorrectly identifies a reflection of a person as a person, then the output of the tracking and detection software may be undesirable. Examples of undesirable outputs include, but are not limited to, miscounting the number of people in a room, mis-identifying a person, counting the same person twice, incorrectly selecting a desirable zoom level, mis-identifying a speaker, identify two people as speaking at once, and possibly other undesirable outputs. While the tracking and detection software may not be characterized as functioning incorrectly, the inputs caused by the reflection(s) confuse the tracking and detection software, thereby causing the various issues described above.

The one or more embodiments provide one or more technical solutions to the above-described technical problems. The one or more embodiments use one or more filters to prevent, automatically, false detections. A true detection is a detection of an object type of interest that actually exists (e.g., a detection of a head of a person actually present in a room captured in a video stream). A false detection is a detection of an object type of interest, but where the detected object is not actually the object type (e.g., a detection of a reflection of a head of a person from a reflective object in the room).

In particular, the one or more embodiments may include three different filters, which may be used individually or in combination. The first filter removes a detected sub-image from further processing if the detected object shown in the detected sub-image fails to meet a confidence threshold. For example, matching software assigns a probability that a detected sub-image is the object type. If the probability fails to meet the confidence threshold, then the detected sub-image is discarded before further processing of the video stream or image.

The second filter compares detected sub-images with each other, and discards one or more detected sub-images when two or more detected sub-images are sufficiently similar. As explained further below, the discarded images have low confidence scores, while the retained images have higher confidence scores. For example, matching software assigns confidence scores that two detected sub-images of the object type are present in the video stream. Similarity software assigns a similarity measure to the two detected sub-images, as compared to each other. If the similarity measure is above a similarity threshold, then the detected sub-image with the lower confidence score is removed before further processing of the video stream or image.

The third filter is a delay filter. If a new sub-image of the object type is newly detected and then continuously remains detected in a video stream, then the newly detected sub-image is not used for further processing of the video stream or image until a threshold time period has passed. The delay filter may be used to distinguish between sub-images that are created from reflected objects and sub-images that are created from physical objects, because reflected objects often exhibit a flickering in the digital image, whereas images of real persons and objects exhibit consistent and steady detection and tracking. For example, if a reflected head is initially detected as a physical person's head moves about in a room, the image of the reflected head will not be subjected to further processing in the video stream until after the threshold time has passed.

Attention is now turned to the figures. FIG. 1 shows a computing system in accordance with one or more embodiments. The computing system includes a data repository (100). In one or more embodiments, the data repository (100) is a storage unit and/or device (e.g., a file system, database, collection of tables, or any other storage mechanism) for storing data. The data repository (100) may be characterized a non-transitory computer readable storage medium. Further, the data repository (100) may include multiple different storage units and/or devices. The multiple different storage units and/or devices may or may not be of the same type and may or may not be located at the same physical site.

The data repository (100) may store, at least temporarily, data used in one or more embodiments. For example, the data repository (100) may store a video stream (102). The video stream (102) may be considered a series of digital images that may form a continuous video. The video stream (102) may take the form of a data structure, such as a video file, and more particularly may be a ".mpg" file or the like. The video stream (102) may be stored in many diverse types of data structures.

The data repository (100) may also store a digital image (104). The digital image (104) may be one of many images taken contiguously as part of the video stream (102). The digital image (104) may also be taken individually as one or more digitized images. The digital image (104) is stored as a digital image file, such as a ".jpg" file, or may be one of the frames of the video stream (102) (i.e., a frame in a ".mpg" file). The digital image (104) may be stored in many diverse types of data structures.

As used herein, the term "object" refers to a physical object. One or more sub-images (106) in the video stream (102) or the digital image (104) may represent the physical object in the video stream (102) or in the digital image (104).

Thus, the data repository (100) stores, or at least tracks, sub-images (106). The sub-images (106) are sub-sections of the video stream (102) or the digital image (104). The sub-images (106) may be considered subsections of the data that forms the video stream (102) or the digital image (104). The sub-images (106) may be referred to as detection bounding boxes and represented by their {x,y} coordinates on a pre-determined or generated coordinate system, along the width and height of the detection bounding boxes.

In a video stream, each frame is extracted and then dilated to downscale frames. Each dilated downscale frame is then divided into sub-images, referred-to as candidate detections. Each candidate detection is then passed through a trained head detection machine learning model that, in turn, assigns each candidate detection a confidence score (of being head) in the range of [0, 1].

The confidence score is a result of layered mathematical computations through the trained machine learning model. The higher the score, the higher the confidence of machine learning model in declaring a candidate as a detected head; the lower the score, the lower the confidence.

Final detections are formulated by thresholding on the score. For example, a candidate window is confirmed as a head if the score is greater than a threshold value. The confidence score is associated with each candidate detection, i.e., sub-image. Only the detections with scores higher than the threshold are designated as confirmed detections of heads.

Each sub-image may be further subdivided into additional ones of the sub-images (106). For example, a sub-image within the sub-images (106) may be an image of a person shown in the digital image (104), but the image of the person may be further sub-divided into an additional sub-image that is defined by the head of the person.

In another example, the sub-images (106) may include a sub-image of a reflective object (108), among other physical objects represented in the video stream (102) or the digital image (104). The reflective object (108) has reflective optical properties. Thus, reflections of physical objects may be shown as additional sub-images among the sub-images (106), along with others of the sub-images (106) that represent other physical objects in the video stream (102).

As indicated above, the sub-images (106) may be further sub-divided. For example, one of the sub-images (106) is an image of a person. In this example, the portion of the digital image having the person may be characterized as a first sub-image (110), and the portion of the digital image having the head may be characterized as a second sub-image (112) within the first sub-image (110). The terms "first sub-image (110)" and "second sub-image (112)" only refer to individual ones of the sub-images (106), and do not necessarily refer to images of a person and the person's head.

The sub-images (106) may be grouped for identification purposes. Thus, as used herein, a set of sub-images (114) is one or more of the sub-images (106) that are classified as belonging to a group. Specifically, the set of sub-images (114) are those of the sub-images (106) that match an object type.

An object type is a classification of an identifiable object shown in the digital image (104) or the video stream (102). Identifiable objects are the objects that the machine learning model is trained to detect. In one example, if the machine learning model is trained to detect persons, chairs, laptops, and heads, then all four are the identifiable objects. In an embodiment, only heads compose the identifiable objects. Object types have object instances. For example, if the object type is "heads", then an instance of the object type (i.e., a particular head detected in the digital image (104) may be a specific person's head shown in the digital image (104).

The data repository (100) also stores one or more selected object types (116). A selected object type is an object type that is of interest for identification in the digital image (104) or the video stream (102). An instance of the selected object types (116) is therefore one of the sub-images (106). For example, the selected object types (116) may be "heads," and the matching software is configured to identify instances of heads in the digital image (104) or the video stream (102). Multiple selected object types may be present. For example, the software may be configured to detect both "heads" and "tables," both of which would then be examples of the selected object types (116).

The data repository (100) also stores one or more confidence scores (118). The confidence scores (118) are numbers assigned to at least the set of sub-images (114), where the confidence score indicates the probability that the sub-image matches the selected object type. These confidence scores are computed through the layered mathematical operations by a trained machine learning model. Thus, any given confidence score is a measure of how closely one of the sub-images (106) matches a selected object type (116), as determined by image recognition software. For example, one of the confidence scores (118) may be the number "0.92," which reflects a 92% chance that the first sub-image (110) is one of the selected object types (116). Different ones of the sub-images (106) may be assigned different confidence scores (118). Confidence scores may be in the range of 0 to 1.

The data repository (100) also stores a confidence threshold value (120). The confidence threshold value (120) is a number indicating a limit with respect to whether one of the sub-images (106) is one of the selected object types (116). In other words, the limit is the value at which one of the sub-images (106) is deemed to be one of the selected object types (116). The limit may be inclusive (e.g., greater than or equal to the limit) or exclusive (greater than the limit).

For example, if the first sub-image (110) has a confidence score of 0.92, and if the confidence threshold value (120) is 0.90, then the first sub-image (110) is determined to be one of the selected object types (116). In a more specific example, if the first sub-image (110) has a confidence score of 0.92, and if the confidence threshold value (120) is 0.90, then the first sub-image (110) is determined to match an object type corresponding to a head (i.e., one of the selected object types (116)). Once a determination is made, a data file, or portion of data, representing the sub-image in question may be assigned metadata that indicates that the sub-image is a member of the selected object type.

The data repository (100) also stores one or more similarity measures (122). The similarity measures (122) are numbers assigned to pairs of the sub-images (106) that match one of the selected object types (116) to within a confidence threshold value (120). There are various methods to compute the similarity measures (122). One of the methods is to compute the L2-distance (Euclidean) distance between features extracted from the detections. The smaller the distance, the larger the match. Computing the Cosine similarity match is another method for computing the one or more similarity measures (122). Computing an image hash is yet another such method.

The number of a similarity measure is a measure of the degree to which the pair of the sub-images (106) match each other. Thus, for example, a higher similarity measure indicates a higher probability that a pair of instances of a selected object type match each other. In a specific example, if the first sub-image (110) and the second sub-image (112) both are in the set of selected object types (116), (e.g., both the first sub-image (110) and the second sub-image (112) are "heads"), then the similarity measures (122) indicates how closely the first sub-image (110) and the second sub-image (112) match each other (e.g., whether the first sub-image (110) and the second sub-image (112) represent both a physical head and a reflection of that physical head).

The data repository (100) also stores a similarity threshold value (124). The similarity threshold value (124) is a number indicating a limit with respect to whether a pair of the sub-images (106) are detected as matching. In other words, the limit, in this case, is the point one of the sub-images (106) determined to match another one of the sub-images (106). The limit may be inclusive (e.g., greater than or equal to the limit) or exclusive (greater than the limit).

A similarity threshold value (124) may be determined by balancing the false positives and true positives. Too low of a threshold can result in too many candidates going into the final detections pool, resulting in a low recall rate but also an increase in false positives. Too high of a threshold can result in fewer false positives, but then but only highly accurate detections go into the final detections pool, resulting in high precision but low recall rate that has the possibility of missing the actual objects of interest. Testing can indicate a favorable similarity threshold value (124).

For example, if the first sub-image (110) and the second sub-image (112) together have a similarity measure of 0.99, and if the similarity threshold value (124) is 0.85, then the first sub-image (110) is determined to match the second sub-image (112). In a more specific example, the first sub-image (110) and the second sub-image (112) are both heads. As a pair, the first sub-image (110) and the second sub-image (112) have a similarity measure of 0.99. Thus, in this example, a determination is made that the first sub-image (110) and the second sub-image (112) are either matching heads (e.g., twins are present in the room) or that one of the first sub-image (110) and the second sub-image (112) is a sub-image of a physical person's head and the other is a sub-image of a reflection of the physical person's head.

The data repository (100) also stores a matrix (126). The matrix (126) is an array of numbers, such as in a table. A matrix may be characterized as having indices that represent a line of values in the matrix. In a two-dimensional matrix there are two indices, a first index that may be referred to as a row and a second index that may be referred to as a column. The intersections of indices are referred to as cells (e.g., the intersection of a row and a column in a two-dimensional matrix is a cell). A number may be assigned to the cell, with the number referred to as a value of the cell. Examples of matrices, and their exemplary uses with respect to the one or more embodiments, are shown in FIG. 8 and FIG. 9.

In an embodiment, the matrix is composed of matching scores of detections with one another. In other words, the values of cells in the matrix represent how closely the match each detection is relative to every other detection. In this embodiment, the matrix may be a square matrix where the diagonal entries are all the same, indicating the matching of detections with themselves.

The data repository (100) also stores a threshold time interval (128). The threshold time interval (128) is a number that represents a limit assigned to a time measured over a contiguous series of digital images in the video stream (102). The time interval indicates the time that elapses before framing, zooming, and the kind of decisions taken on the detection and tracking of people and objects. Use of the threshold time interval (128) is described with respect to FIG. 7. The limit may be inclusive (e.g., greater than or equal to the limit) or exclusive (greater than the limit).

The data repository (100) also stores at least an indication of removed sub-images (130). The removed sub-images (130) are those sub-images that are removed from further consideration when the controller (132), described below, processes the video stream (102) or the digital image (104). The removed sub-images (130) might not be removed from the video stream (102) or from the digital image (104). Thus, for example, the video stream (102) or the digital image (104) may still contain one or more of the removed sub-images (130) when displayed; however, the removed sub-images (130) will not be used for further processing of the video stream (102) or the digital image (104). Optionally, the removed sub-images (130) may also be removed from the display of the video stream (102) or the digital image (104).

The system shown in FIG. 1 may include other components. Thus, for example, the system shown in FIG. 1 may include a controller (132). The controller (132) is software, hardware, or a combination thereof programmed or configured to perform one or more functions as described with respect to FIG. 2 and FIG. 3. The controller (132) is in communication with the data repository (100), possibly over the network (156) (described below).

The controller (132) includes an image processing controller (134). The image processing controller (134) is software or application specific hardware that is programmed to execute evaluations of the video stream (102) or the digital image (104). The image processing controller (134) may perform various functions, such as detecting that one or more of the sub-images (106) are of the selected object types (116), or assigning to the sub-images (106) confidence scores that the sub-images (106) match the selected object types (116). The image processing controller (134) may perform other functions, such as evaluating the confidence scores (118), the similarity measures (122), and using the confidence threshold value (120) and similarity threshold value (124). The controller (132) may also populate and use the matrix (126). The removed sub-images (130) are taken out of the set of sub-images (106) which the image processing controller (134) processes.

The controller (132) may also include a first filter (136). The first filter (136) is software or application specific hardware programmed to determine whether one or more of the sub-images (106) are to be considered removed sub-images (130). Removed sub-images (or detections) are sub-images that are discarded, ignored, or otherwise not considered during further processing. Operation of the first filter (136) is described with respect to FIG. 7.

The controller (132) may also include a second filter (138). The first filter (138) is also software or application specific hardware programmed to determine whether one or more of the sub-images (106) are to be considered removed sub-images (130). Operation of the second filter (138) is described with respect to FIG. 2 and FIG. 7.

The controller (132) may also include a third filter (140). The third filter (140) is also software or application specific hardware programmed to determine whether one or more of the sub-images (106) are to be considered removed sub-images (130). Operation of the third filter (140) is described with respect to FIG. 3 and FIG. 7.

Figure 4:
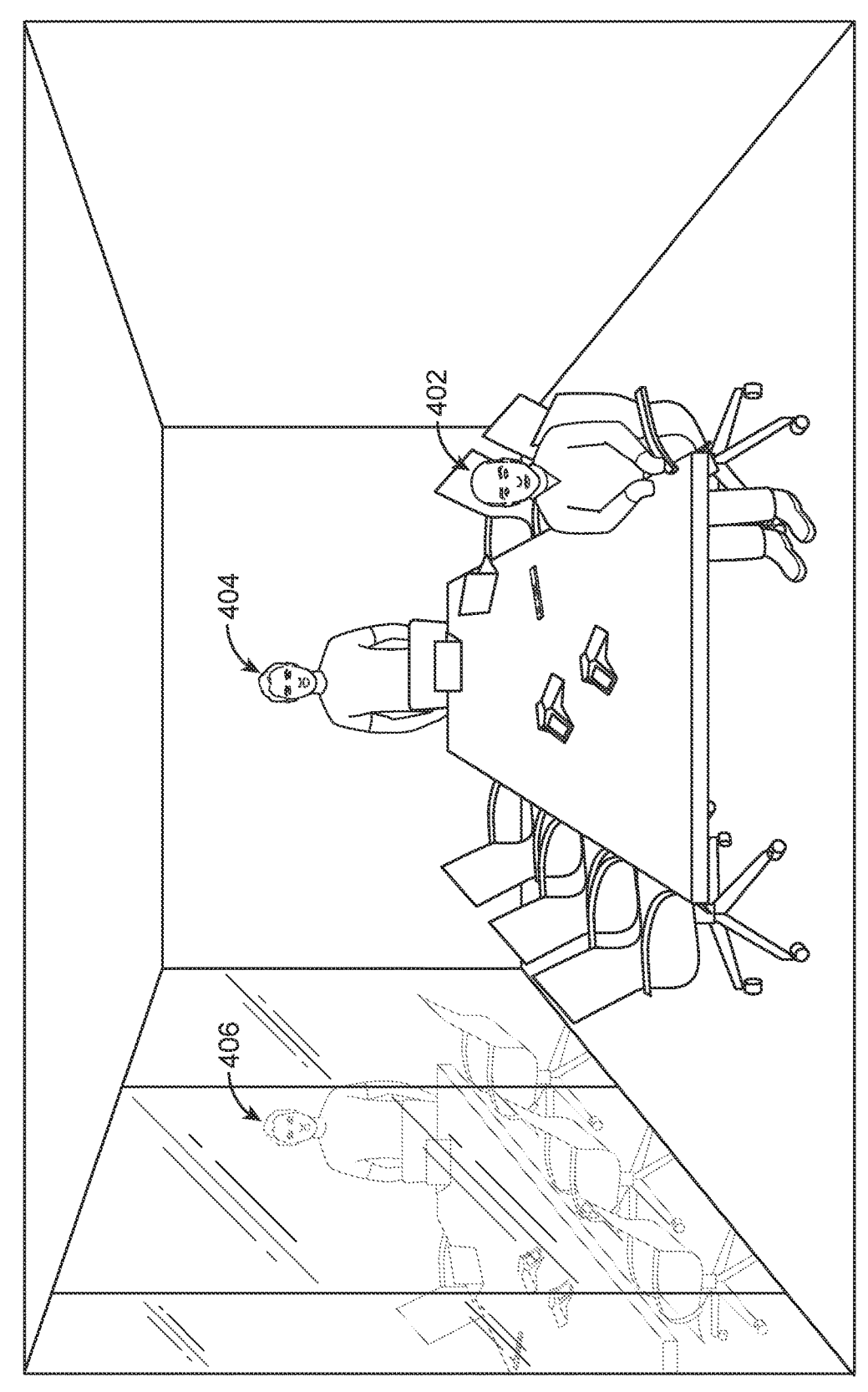
FIG. 4, FIG. 5, and FIG. 6 show an example of filtering a video stream, in accordance with one or more embodiments.
Figure 5:
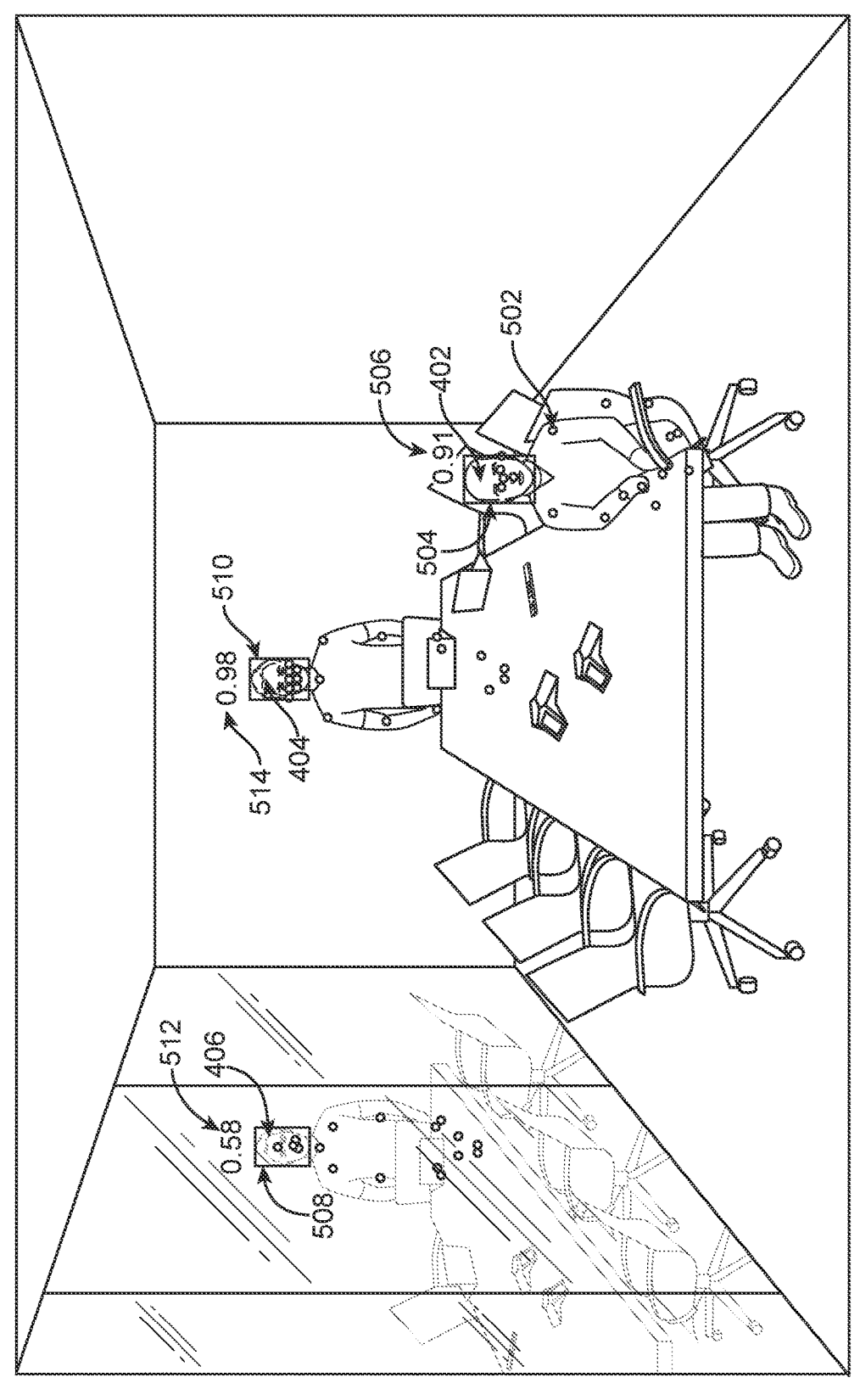
Figure 6:
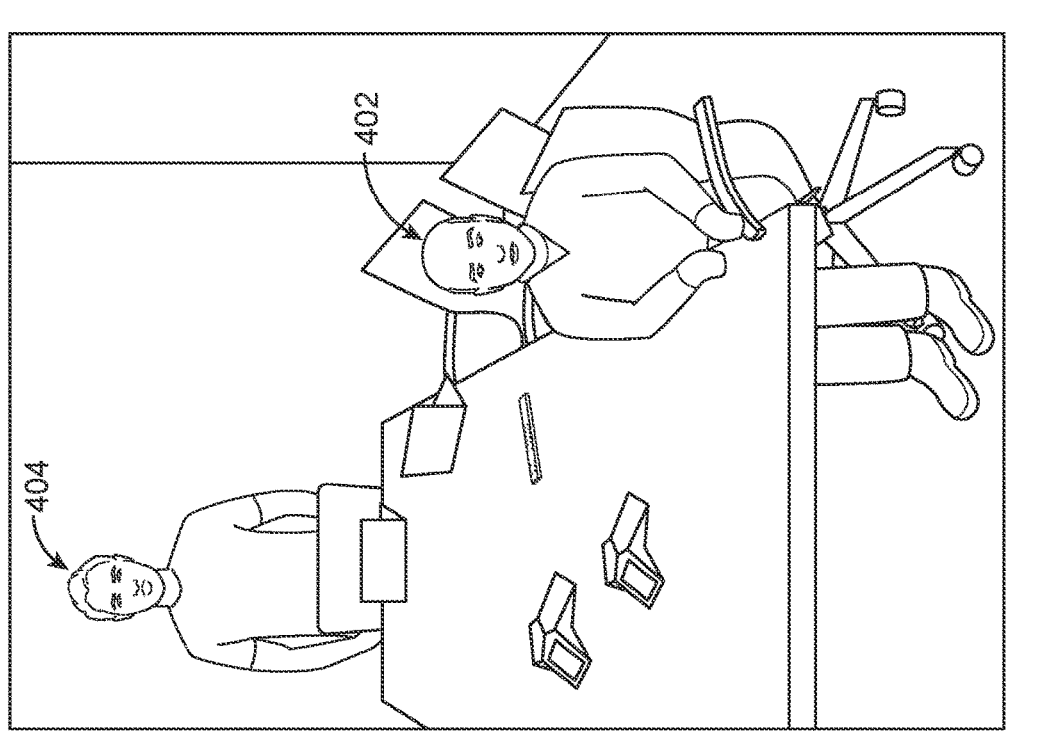

The controller (132) may also include a video controller (142). The video controller (142) is software or application specific hardware programmed to manipulate the video stream (102) or the digital image (104) in response to an output of the image processing controller (134). For example, if the image processing controller (134) determines that the first sub-image (110) should be framed, but that the second sub-image (112) is a reflection, then the video controller (142) might only frame the first sub-image (110). Operation of the video controller (142) is described with respect to FIG. 7, and an example of the operation of the video controller (142) is shown in FIG. 4 through FIG. 6.

The controller (132) may also include a tracking and detection controller (144). The tracking and detection controller (144) is software or application specific hardware programmed to detect and track one or more instances of the selected object types (116) of the sub-images (106) in the digital image (104) or the video stream (102). For example, the tracking and detection controller (144) may detect and track heads and the locations of the heads in the video stream (102). An example of an operation of the tracking and detection controller (144) is described with respect to FIG. 4 through FIG. 6.

The controller (132) may also include a communication device (146). The communication device (146) is hardware, software, or a combination thereof, configured to permit communication between the controller (132), the data repository (100), and possibly a network (156). For example, the controller (132) may be the communication interface (1008) described with respect to FIG. 10A.

The controller (132) may include, or be executed by, a computer (148). The computer (148) includes one or more processors, represented by processor (150) in FIG. 1, possibly in a distributed or cloud computing environment. The computer (148) also includes a memory (152). The memory (152) may include a non-transitory computer readable storage medium. The computer (148) also may include a user input device (154). The user input device (154) is operable to enter user-provided instructions to the computer (148) and the controller (132).

The system shown in FIG. 1 also may include a network (156). The controller (132), the data repository (100), or both, may be in communication with the network (156). The network (156) is one or more networked computers or communication components that permit electronic communication between the computers or communication components. An example of a network is the network (1020) described with respect to FIG. 10B.

The system shown in FIG. 1 optionally may also include one or more user devices (158), which may communicate with the controller (132) via the network (156), for example.

The user devices (158) are computers, such as desktops, laptops, tablets, mobile phones, etc.

Each user device may include a user input device (160). The user input device (160) is a device that allows a user to interact with the user devices (158). Examples of the user input device (160) may include a keyboard, a mouse, a widget on a graphical user interface (GUI), a microphone, etc.

Each user device may include a display device (162). The display device (162) is a screen that allows a user to see the GUI.

Each user device may include a camera (164). The camera (164) is another example of a user input device (160). The camera (164) may be used to generate the video stream (102) or the digital image (104), which is then transmitted to the controller (132) for processing, possibly via the network (156).

FIG. 2 and FIG. 3 show flow diagrams illustrating a set of steps of a method for filtering a video stream, in accordance with one or more embodiments. FIG. 2 shows an example of the operation of the second filter (138) described in FIG. 1. FIG. 3 shows an example of the operation of the third filter (140) described in FIG. 1. The methods shown in FIG. 3 may therefore be performed using the system shown in FIG. 1, possibly using components from the computer system and network shown in FIG. 10A and FIG. 10B.

Attention is first turned to the method of FIG. 2. Step 200 includes detecting, in a digital image, a set of sub-images matching a selected object type. Image processing software may determine whether a given sub-image matches the selected object type. For example, a trained machine learning algorithm may determine that a particular sub-image is a head, or some other selected object type.

Step 202 includes generating a first confidence score that a first sub-image in set of sub-images matches a selected object type. The image processing software may detect the set of sub-images at step 200 and generate the confidence scores at step 202 concurrently, or as part of the same detection process. The confidence scores are result of layered mathematical computations through the use of a trained machine learning model. For example, sub-images may be assigned confidence scores, and those sub-images having confidence scores above a threshold value are flagged or marked as matching the selected object type.

Step 204 includes generating a second confidence score that a second sub-image in set of sub-images matches the selected object type. Step 204, like step 202, may be performed concurrently with or part of step 200. The second sub-image, however, is different than the first sub-image.

Step 206 includes generating a similarity measure by comparing the first sub-image to the second sub-image. The first and second sub-images may be compared to each other by image recognition software that determines how closely the two sub-images match each other. For example, a Siamese machine learning network may determine the probability that the first and second sub-images match each other. The probability is the similarity measure in this example.

Generating the similarity measure may also be performed using other methods. For example, as exemplified in FIG. 8 and FIG. 9, a similarity matrix may be generated. Cells in the similarity matrix represent similarities of sub-images relative to each other. The similarity measures the first sub-image and the second sub-image is the value of a corresponding cell.

The similarity measures in the matrix may be generated using machine learning (as indicated above), or other image processing software. Examples of other image processing techniques include use of a Cosine similarity index determined for the pairs of sub-images. Another example of an image processing technique includes using image hash values of the first sub-image and the second sub-image as the similarity value for the first and second sub-images.

Step 208 includes removing, responsive to the similarity measure exceeding a similarity threshold value and the first confidence score exceeding the second confidence score, the second sub-image from the set of sub-images. In other words, if the two sub-images match each other closely enough (i.e., the similarity measure satisfies the similarity threshold value), then the sub-image with the lower confidence score (e.g., the second sub-image in this case) is treated as a removed sub-image. The second sub-image may be removed by setting a flag or some other indicator that the second sub-image should not be further processed, or by removing the second sub-image from a set of sub-images that match the selected object type.

Step 210 includes processing, after removing, the digital image using the set of sub-images. Processing may include taking some action with respect to the digital image, which may be part of a video stream. For example, processing may include zooming or framing a sub-image that is in the set of sub-images remaining after removing at step 208. Processing may include counting a number of the set of sub-images remaining after removal at step 208. Processing the set of sub-images may include other actions, such as, but not limited to, tracking and detection the set of sub-images, recognizing sub-images (e.g., using facial recognition software), modifying the digital image (e.g., by removing the removed sub-images), and combinations thereof.

The modified digital image, or modified video stream, then may be presented on a display device. Thus, as indicated above, modifying may include zooming the digital image on the first sub-image to form the modified digital image, wherein the modified digital image excludes the second sub-image. The modified digital image may show a framing box added around a selected sub-image of an object, in another example.

The method of FIG. 2 may be used as a second filter to prevent sub-images of reflections of physical objects from being detected as sub-images of physical objects by the video controller. For example, the second sub-image may represent a reflection of the first sub-image. The reflection is caused by a reflective object shown in the digital image. In this case, the second filter removes the second image from the set of sub-images used by the video controller to process the video stream or the digital image.

In a more specific example, the method of FIG. 2 may further include receiving the digital image from a video stream taken by a video conferencing camera. In this example, the selected object type is a head. The second sub-image includes a reflection of a head from a reflective object in the digital image. The video controller will only use the detection of the first sub-image to modify the video stream, in this example.

Attention is now turned to FIG. 3. The method of FIG. 3 is an example of the operation of the third filter (140) described with respect to FIG. 1.

Step 300 includes detecting, at a first time, a sub-image representing an object matching a selected object type in a first digital image in video stream. Detecting the sub-image of the object may be performed using image recognition software, as described above with respect to FIG. 2. The sub-image of the object matches a selected object type when the image recognition software determines a probability (that the sub-image of the object contains an instance of the selected object type) that satisfies a match threshold.

Step 302 includes determining, based on detecting, whether continual detection of the sub-image of the object exists in digital images that are subsequent to the first digital image in the video stream. The determination of continual detection is "based on" detecting because detecting is the initial time for step 302. Continual detection exists when at least a threshold number of the digital images in the video stream (e.g., half or more of the digital images) contain detections of the sub-image of object during a defined time period. Detection of the sub-image of the object in the digital images may be performed as described above in step 200 of FIG. 2.

Step 304 includes blocking a use of the sub-image of the object for a modification of the video stream, at least, until a second time has passed after the first time. Blocking use of the sub-image of the object for modification of the video stream may be performed according to the procedure described with respect to step 208 of FIG. 2. Thus, for example, blocking may include preventing a decrease in a zoom magnification of the video stream to include both the sub-image of the object and a second sub-image of a second object detected, at least before the threshold time interval has passed. Alternatively, blocking may include delaying insertion of sub-image(s) of a head and a body connected to the head into the video stream. Many other examples are possible.

The method of FIG. 3 may be modified or further extended. For example, the method of FIG. 3 may also include generating, within the second time, a similarity score representing a similarity between the sub-image of an object and a third sub-image of a reflective object in the video stream. Generation of the similarity score may be performed using the procedures described with respect to step 206 of FIG. 2. Then, the method of FIG. 3 may further include blocking, responsive to the similarity score exceeding a similarity threshold value, use of the third sub-image of the reflective object for the modification the video stream. In this example, the third sub-image has a first confidence score that is lower than a second confidence score of the sub-image of the object. Again, blocking may be performed as described above.

In another variation, the method of FIG. 3 may also include modifying, using the object, the video stream after the second time has passed. After the second time has passed, it might be possible to assume that the detected sub-image is a sub-image of a physical object, and not a sub-image of a reflection. Thus, once the second time has passed, the method may include modifying the video stream in a manner that had been previously blocked.

In a specific example, after the second time has passed, a newly detected sub-image of a head might be used by the video controller (142) of FIG. 1 to adjust the zoom level of the video stream to include the sub-image of the newly detected head. Other examples of modifying include adjusting a zoom of the video stream; framing the object; adding a text or a picture in the video stream, adjacent the sub-image of the object; recording a name of a person whose head is the object, and combinations thereof.

FIG. 4 through FIG. 9 present specific examples of the techniques described above with respect to FIG. 1 through FIG. 3. The following examples are for explanatory purposes only and not intended to limit the scope of the one or more embodiments.

Attention is first turned to FIG. 4 through FIG. 6. FIG. 4 through FIG. 6 represent a series of digital images taken as part of a single video stream. Thus, FIG. 4 through FIG. 6 share common reference numerals having common descriptions.

FIG. 4 shows a representation of a digital image (400) taken by a camera. The digital image (400) is received by a controller, such as the controller (132) described with respect to FIG. 1. In the example of FIG. 4 through FIG. 6, the controller (132) of FIG. 1 is programmed to adjust, automatically, a zoom level of the camera to focus on the detected heads of people in the conference room.

The digital image (400) is a first image taken in the video stream in this example. The digital image (400) includes a first sub-image (402) of a first head of first person, a second sub-image (404) of a second head of a second person, and a third sub-image (406) that is a reflection in the glass wall of the second head of the second person. In FIG. 4, no zoom adjustment has yet taken place. However, in this example, it would be undesirable to include the reflection of the second person during processing of the digital image (400).

FIG. 5 shows an intermediate step in processing of the digital image (400), and thus shows an example of the operation of the image processing controller (134) of FIG. 1. In an embodiment, the digital image (500) is not shown in the video stream. Rather, the digital image (500) might be visible to a programmer or technician who is responsible for maintaining the controller (132) of FIG. 1. In an embodiment, the digital image (500) only shows how the controller (132) may treat the digital image (400) of FIG. 4.

A series of markers, such as marker (502), define the outlines of the people (i.e., sub-images) detected by the image processing controller (134) of FIG. 1. Additionally, the individual heads are detected, as indicated by the framing boxes, such as first framing box (504), second framing box (510), and third framing box (508). At a later step, described below, the video controller (142) of FIG. 1 will adjust the zoom automatically based on the detected heads.

Additionally, confidence scores, such as confidence score (506), are shown above each head. The confidence scores are numbers that reflect a determined probability that a sub-image is a head (e.g., the probability that the first sub-image (402), which is the portion of the digital image (500) within the first framing box (504), is a head). The confidence scores are determined using the procedures described with respect to step 202 of FIG. 2. Confidence scores below a threshold value might not be shown in the digital image (500). Thus, for example, other sub-images within the digital image (500) might be evaluated by the image processing controller (134) of FIG. 1 to determine whether a given sub-image contains a head. However, only those sub-images having confidence scores above 0.55 are shown in the example of FIG. 5.

In the example of FIG. 5, a third framing box (508) contains the third sub-image (406), which is a reflection of the second sub-image (404) of the head of the second person. Because the reflection is not a perfect reflection, the confidence score (512) of the third sub-image (406) in the third framing box (508) is only 0.58. A perfect reflection is a detection that has a high (or low if distance-based matching is performed) matching score with one of the other detections, and has same or lower confidence value than that of the matched detection. In contrast, the confidence score (514) for the second sub-image (404) within the second framing box (510) of the second person is 0.98. Thus, the predicted probability that the second sub-image (404) is a head is 98%. This fact is useful with respect to the second filter (138), described above with respect to FIG. 1.

FIG. 6 shows a zoomed image (600), which is generated using an automatic zoom adjustment of the digital image (400) of FIG. 4. In the example of FIG. 6, the image processing controller (134) of FIG. 1 has applied the first filter (136), the second filter (138), and the third filter (140) of FIG. 1. As a result, a determination is made under one or more of the filters, that the third sub-image (406) in the third framing box (508) (in FIG. 5) should not be used during processing of the digital image (400). In other words, the third sub-image (406), which was the reflection of the head of the second person, was blocked, excluded, or deleted from processing by the video controller (142) of FIG. 1.

Accordingly, the video controller (142) of FIG. 1 automatically adjusts the zoom level of the digital image (400) to include only the first sub-image (402) of the first person, and the second sub-image (404) of the second person. In this manner, the zoomed image (600) is automatically zoomed to a desirable degree (i.e., the zoom level is not influenced by the presence of the reflection of the second person in the glass wall).

Attention is now turned to FIG. 7. FIG. 7 is an example of another method for filtering a digital image or a video stream, relative to FIG. 2 and FIG. 3. The method of FIG. 7 may be implemented using the system shown in FIG. 1.

Step 702 includes inputting an image frame. The image frame may be received from a camera, which may be a remote camera. The image frame may be part of a video stream. The image frame is input into an image processing controller, such as the image processing controller (134) of FIG. 1.

Step 704 includes applying a head detector. The head detector may be an image recognition classification detection machine learning model, or some other software, as explained with respect to step 200 of FIG. 2. The head detector detects heads in the input image frame. The head detector may also count the heads, and also may determine the location each head in image plane coordinates.

Step 706 includes applying a first filter. The first filter may be the first filter (136) of FIG. 1. The first filter discards those detected heads having confidence scores below a confidence threshold value. The discarded heads are considered removed sub-images, as described with respect to FIG. 1.

Step 708 includes applying a second filter. The second filter may be the second filter (138) of FIG. 1. The second filter finds pairs of heads that are similar to each other, and removes sub-images of heads from the pairs. The removed sub-images are those sub-images that have lower confidence scores. An example of the operation of the second filter is described with respect to FIG. 2. Nevertheless, steps 710, 712, and 714 are sub-steps in the process of applying the second filter at step 708.

Step 710, which is a sub-step of step 708, includes generating a similarity matrix. An example of a similarity matrix is shown in FIG. 9. The similarity matrix may be generated by using an image recognition algorithm to generate a value that represents the degree of similarity between a pair of heads. The image recognition algorithm may be repeated for each pair of detected heads, as described with respect to FIG. 9.

Step 712, which is a sub-step of step 708, includes identifying matching pairs of detected heads in the similarity matrix. Matching is performed by identifying sets of two heads that have similarity scores above a similarity threshold value. Matching is further described with respect to step 206 of FIG. 2.

Step 714, which a sub-step of step 708, includes retaining detections of heads with the highest confidence scores. Specifically, with respect to each pair of matching heads, the head with the highest confidence score within a given pair is retained. The other head becomes a removed sub-image. The process of removing (and thereby retaining) detected heads is described with respect to step 208 of FIG. 2.

Step 716 includes applying the third filter. The third filter may be the third filter (140) of FIG. 1. The third filter may include delaying use of a newly detected head for further processing of the input image frame, until i) a time threshold has passed and ii) the newly detected head has been continuously detected during the time threshold. The term "continuously" may include detection of the sub-image in less than all image frames of a video stream, in some embodiments.

In other words, the third filter is a delay filter. Before the time threshold has passed, the newly detected head is defined as being one of the removed sub-images.

Step 718 includes consolidating retained detections of heads. In other words, all those heads that are not removed heads may be consolidated for purposes of further processing of the input image frame. Consolidation may include, for example, establishing a file or data structure that contains the sub-images of the heads that have not been deemed removed sub-images.

Step 720 includes sending the detected heads (i.e., the file or data structure that contains the sub-images of the retained heads) for further processing. For example, the detected heads may be provided as input to the video controller (142) or the tracking and detection controller (144) of FIG. 1, or both. The detected heads are then used to modify the input image frame or the video stream, as described with respect to step 210 of FIG. 2 or step 304 of FIG. 3. In one embodiment, the method of FIG. 7 may terminate thereafter.

FIG. 8 and FIG. 9 show examples of matrices that may be used with the one or more embodiments described above. In particular, FIG. 8 shows a detection matrix (800) data structure that describes the detection of "n" sub-images (e.g., n heads). Each row of the matrix represents a distinct detected sub-image. The values of "x" and "y" indicate the X-Y coordinates of the sub-image within a coordinate system established for the digital image. The "width" and "height" indicate the width and height of the sub-image on the same coordinate system. The "score" is the confidence score for the sub-image in question as determined by, for example, the computer vison machine learning algorithm.

FIG. 9 shows a similarity matrix (900) data structure that describes the similarities between any two detected sub-images (e.g., heads) in the digital image. The rows and columns both reflect the sub-images in an array. A cell in the similarity matrix (900) holds a similarity score between a pair of heads represented by the row and intersecting column. The diagonal cells of the matrix (from upper left to lower right) represent the similarity of a sub-image with itself, and will have a value at or near "1" (i.e., a "1" reflects perfect similarity). If the cosine similarity measure is used as a matching technique, the diagonal elements would all be "1."

The non-diagonal cell entries reflect the similarities of sub-images with some other sub-image detected in the digital image. Thus, for example, the upper left entry in the similarity matrix (900) is the similarity score of the pair of sub-images formed by the first detected sub-image and the last detected sub-image.

In the one or more embodiments, finding pairs of sub-images that are similar to each other involves identifying off-diagonal cells that have similarity values that satisfy the similarity threshold value. In this manner, similar sub-images (i.e., matched pair of sub-images) may be found rapidly. The process is computationally efficient, because diagonal cells may be discarded prior to comparing cell values of the similarity matrix to the similarity threshold.

Referring to the system shown in FIG. 1, a configuration of components is shown. Other configurations may be used without departing from the scope of the one or more embodiments. For example, various components may be combined to create a single component. As another example, the functionality performed by a single component may be performed by two or more components.

Referring to the flowcharts described herein, while the various steps in the flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments. Thus, the one or more embodiments are not necessarily limited by the examples provided herein.

The specific embodiments identified above were described in detail with reference to the accompanying figures. Like elements in the various figures are denoted by like reference numerals for consistency.

In the preceding detailed description of embodiments, numerous specific details are set forth in order to provide a more thorough understanding of the one or more embodiments. However, it will be apparent to one of ordinary skill in the art that the one or more embodiments may be practiced without these specific details. In other instances, well-known features have not been described in detail to avoid unnecessarily complicating the description.

While the one or more embodiments have been described with respect to a limited number of embodiments, those skilled in the art, having benefit of this disclosure, will appreciate that other embodiments can be devised which do not depart from the scope of the one or more embodiments as disclosed herein. Accordingly, the scope of the one or more embodiments should be limited only by the attached claims.

What is claimed is:

1. A controller comprising:
a processor coupled to a non-transitory computer readable storage medium,
wherein the processor is to:
  execute an image processing controller to:
    detect, in a digital image of a video stream, that a plurality of sub-images correspond to a selected object type, and
    assign, to the plurality of sub-images, a plurality of confidence scores corresponding to the plurality of sub-images, wherein the plurality of confidence scores comprise measures that the plurality of sub-images are of the selected object type;
  execute a first filter to:
    block use of a first subset of the plurality of sub-images when modifying the video stream, the first subset comprising first ones of the plurality of sub-images having confidence scores below a confidence threshold value;

execute a second filter to:
    delay, by a threshold time interval, use of a second subset of the plurality of sub-images when modifying the video stream, wherein the second subset comprises second ones of the plurality of sub-images detected before the threshold time interval;
  execute a third filter to:
    block use of a selected sub-image in the plurality of sub-images when modifying the video stream, wherein the selected sub-image is selected from one of a first sub-image having a first similarity score within a similarity threshold value of a second similarity score of a second sub-image, and wherein the selected sub-image comprises a lower confidence score in the plurality of confidence scores; and
wherein a video controller is to:
  modify the video stream using the first filter, the second filter, and the third filter;
wherein the selected object type comprises heads of people;
wherein the video controller is further configured to modify the video stream by performing one of:
  i) zooming in on and framing of the heads after the first filter,
  ii) the second filter, and
  iii) the third filter; and
wherein the first subset, the second subset, and the selected sub-image comprise reflections of the heads from a reflective object in the video stream.

2. The controller of claim 1, wherein the controller further comprises:
a tracking and detection controller configured to recognize and track the heads in the video stream.

3. The controller of claim 1, further comprising:
a communication device, in communication with the processor, and configured to receive the video stream.

4. The controller of claim 1, wherein the processor is to execute the second filter to:
determine whether continual detection of newly detected sub-images exists in subsequent digital images of the video stream.

5. The controller of claim 1, wherein delay by the second filter of use of the second subset distinguishes between sub-images created from reflected objects and the sub-images created from physical objects based on detection consistency over time.

6. The controller of claim 1, wherein the processor is to execute the third filter to:
generate a similarity matrix containing similarity measures between pairs of sub-images in the plurality of sub-images.

7. The controller of claim 6, wherein the processor is to execute the third filter to:
identify, using the similarity matrix, the first sub-image having the first similarity score within the similarity threshold value of the second similarity score of the second sub-image.

8. The controller of claim 7, wherein the processor is to execute the third filter to:
block the use of a selected sub-image in the plurality of sub-images when modifying the video stream.

9. The controller of claim 8, wherein the selected sub-image is selected from one of the first sub-image and the second sub-image.

10. The controller of claim 8, wherein the selected sub-image comprises a lower confidence score in the plurality of confidence scores.

11. The controller of claim 1, wherein the video controller is to modify the video stream using the first filter, the second filter, and the third filter to adjust a zoom level of the video stream to include only non-blocked sub-images of the plurality of sub-images.

12. A controller comprising:

a processor coupled to a non-transitory computer readable storage medium, wherein the processor is to:

execute an image processing controller to:

detect, in a digital image of a video stream, that a plurality of sub-images correspond to a selected object type, and assign, to the plurality of sub-images, a plurality of confidence scores corresponding to the plurality of sub-images, wherein the plurality of confidence scores comprise measures that the plurality of sub-images are of the selected object type;

execute a first filter to:

block use of a first subset of the plurality of sub-images when modifying the video stream, the first subset comprising first ones of the plurality of sub-images having confidence scores below a confidence threshold value;

execute a second filter to:

delay, by a threshold time interval, use of a second subset of the plurality of sub-images when modifying the video stream, wherein the second subset comprises second ones of the plurality of sub-images detected before the threshold time interval; and execute a third filter to:

generate a similarity matrix containing similarity measures between pairs of sub-images in the plurality of sub-images, identify, using the similarity matrix, a first sub-image having a first similarity score within a similarity threshold value of a second similarity score of a second sub-image, and block use of a selected sub-image in the plurality of sub-images when modifying the video stream, wherein the selected sub-image is selected from one of the first sub-image having the first similarity score within the similarity threshold value of the second similarity score of the second sub-image, wherein the first sub-image and the second sub-image represent a physical object and a reflection of the physical object from a reflective surface in the digital image, wherein the selected sub-image comprises a lower confidence score in the plurality of confidence scores, and wherein a video controller is to:

modify the video stream using the first filter, the second filter, and the third filter.

\* \* \* \* \*